United States Patent Office 3,830,718
Patented Aug. 20, 1974

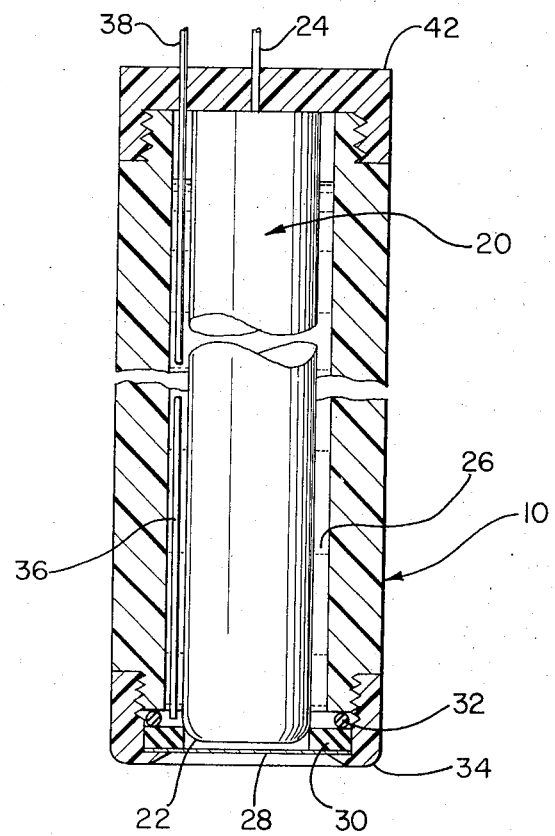

3,830,718
AMMONIA SENSOR
John H. Riseman and John Krueger, Cambridge, and Martin S. Frant, Newton, Mass., assignors to Orion Research Incorporated, Cambridge, Mass.
Filed Mar. 22, 1973, Ser. No. 343,868
Int. Cl. G01n 27/46
U.S. Cl. 204—195 P 2 Claims

ABSTRACT OF THE DISCLOSURE

An ammonia electrode has a standard electrolyte solution comprising a saturated aqueous solution of an ammonium salt of a strong acid anion (e.g., picrate) having a pK not more than 3, the salt having an aqueous solubility at room temperature such that the ammonium ion concentration is about 0.001 M to 1 M.

---

This invention relates to electrochemical analysis, and particularly to analytical devices in which the ammonia content of sample gases of liquids is measured potentiometrically monitoring the change in pH of a standard electrolyte into which ammonia diffuses through a selectively ammonia-permeable barrier. In particular, the invention relates to improved standard electrolytes for such devices.

Electrochemical methods for the determination of ammonia are typically based on potentiometric measurement of the change in pH caused by diffusion of ammonia into a standard electrolyte solution. Typically, ammonia from a sample liquid or gas enters the electrolyte through a filter or membrane which is selectively permeable to ammonia gas. Ammonia will diffuse into or out of the standard solution until the partial pressure of ammonia is the same on each side of the membrane. Ammonia will react, to some extent, reversibly with water according to the equation:

$$NH_3 + H_2O \rightleftharpoons NH_4^+ + OH^-$$

where $$\frac{[NH_4^+][OH^-]}{[NH_3]} = K$$

K being a constant.

If the standard solution contains a dissolved ammonium salt in sufficient amount, the ammonium ion concentration of the solution may also be considered fixed at K'. Thus, the hydroxyl ion concentration may be considered a function of the ammonia concentration, or $$[OH^-] = [NH_3] K''$$

where $K'' \propto KK'$. The hydroxyl ion concentration is, of course, measurable by a pH electrode or other pH-detecting device, utilizing the relationships:

$$[H^+][OH^-] \simeq 10^{-14}, \text{ and } pH = -\log [H^+].$$

The partial pressure of ammonia, $P_{NH_3}$, in turn, is related to the ammonia concentration by Henry's law:

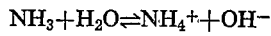
$$P_{NH_3} = Q[NH_2]$$

where Q is a proportionality constant dependent on the amount of ammonia or ammonia-producing species in the sample, as well as the sample temperature. In practice, therefore, ammonia concentration is determined by preparing a calibration curve of pH against known ammonia standard solutions which have varying amounts of ammonia spanning the expected amount of the sample. The calibration curves are plotted on semilog graph paper by plotting the potential readings, in mv., on the linear axis versus ammonia concentration on the semilog axis, which will give a straight-line calibration curve, in accordance with the Nernst equation.

In the past, the standard electrolyte solution has been typically a dilute solution of a very soluble ammonium salt. For example, in the Strickler et al. U.S. Pat. No. 3,649,505, issued Mar. 14, 1972, a combination pH electrode has a hydrophobic, ammonia-permeable membrane which confines a standard electrolyte consisting of 0.01 M to 3 M ammonium chloride adjacent the ion-sensitive glass bulb of the pH electrode. To use the electrode, it is simply dipped into the ammonia-containing sample solution, and the change in potential due to the change in pH is measured when the sample solution and standard electrolyte come to equilibrium. In practice, a calibration curve is usually first prepared, in which the change in potential resulting from immersing or dipping the electrode into plurality of different ammmonia-containing solutions of known ammonia concentration is measured and plotted on semilog paper against the known concentration. Preparing such curves, then, may require moving the electrode into and out of a series of such known solutions. In addition, after the calibration curves have been made, actual measurement of a number of unknown ammonia-containing samples may again require moving the electrode into and out of a number of unknown samples, and between sample locations. Unless one is willing to refill the electrode with standard electrolyte solution after each measurement, an obviously inefficient technique, then care must be taken that the concentration of the standard electrolyte does not change when the electrode is removed from the ammonia-containing sample solution.

However, although the ammonia filters are not water-permeable, the materials typically used in such filters are water-vapor permeable. Hence, when the electrode is exposed to air, some water from the standard electrolyte solution can evaporate through the membrane. Since only a very small total volume of electrolyte (typically only a few cc. or less) is present in the electrode, loss of even very small amounts of water by evaporation can change the concentration of the dilute electrolyte solution enough to give erroneous results when the electrode is re-inserted into the next ammonia-containing solution.

It is therefore an object of the present invention to provide an improved standard electrolyte medium which will be immune to concentration changes in the reference ammonium salt solution due to evaporation of water from the solution through the selectively ammonia-permeable filter of the electrolyte-containing electrode.

A more general object is to provide improved analytical devices for potentiometric measurement of ammonia which may be used to provide accurate determinations of the ammonia content of a series of ammonia-containing samples without the necessity for disassembling the electrode and refilling the electrode with standard electrolyte solution.

The foregoing and other objects of the invention are generally embodied in an electrochemical cell for measuring the ammonia content of a sample, the cell having a potentiometric hydrogen ion-sensitive electrode in contact with a standard electrolyte and an ammonia-permeable filter arranged to separate the electrolyte from the sample so that ammonia from the sample passes through the filter into the electrolyte to affect the hydrogen ion activity of the electrolyte, wherein the standard electrolyte comprises a saturated aqueous solution of an ammonium salt of a strong acid anion having a pK not more than 3, the salt having an aqueous solubility at room temperature such that the ammonium ion concentration is about 0.001 M to 1 M. A preferred salt is ammonium picrate.

The advantage in using such a salt is that if the cell is removed from the sample solution exposing the sample-contacting side of the membrane to air and evaporation occurs through the membrane, the loss of water will cause the ammonium salt to be precipitated, maintaining the molarity of the solution. Because of the very slight solubility of ammonium picrate (a saturated solution at room temperature is only about 0.05 M), and the small amount of actual water loss through the membrane the amount of picrate salt actually precipitated at the membrane surface will be insignificant and have no noticeable effect on the porosity and ammonia-permeability of the membrane.

Other objects of the present invention will in part appear obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawing wherein there is shown a diagrammatic cross-sectional view of an exemplary electrode containing the electrolyte solution of the invention.

Referring now to the drawing, there will be seen a specific embodiment of an ion sensitive electrode embodying the principles of the present invention and comprising a substantially tubular body or barrel 10 of electrically nonconductive, substantially chemically inert material such as polytetrafluoroethylene or the like. Disposed within the hollow interior of tube 10 is a first electrode, indicated generally at 20. Electrode 20 is any of a number of well known pH glass electrodes which are usually formed as a hollow cylinder of a non-conducting glass, closed at one end of a bulb or membrane 22 of a hydrogen-ion sensitive glass. Such pH electrodes also include an internal reference electrode, typically Ag/AgCl (not shown), immersed in a suitable electrolyte filling solution. The internal reference of the pH electrode is connected to external lead 24.

Barrel 10 is internally dimensioned so that there is a substantial interspace between the external periphery of pH electrode 20 and the inside of barrel 10. Disposed within that interspace is standard solution 26.

Membrane 22 of pH electrode 20 is supported about its periphery by one side of spacer ring 30. Stretched across the other side of spacer ring 30 and thereby held at a precisely predetermined distance from membrane 22, is membrane 28. Spacer ring 30 is sealed to an end of barrel 26 by elastomeric O-ring 32. Spacer ring 30, O-ring 32 and membrane 28 are all releasably held in a predetermined relation with respect to membrane 22 by cap 34 which is threadedly mounted on barrel 10. Lastly, a second or reference electrode 36, typically an Ag/AgCl wire, is also disposed in contact with solution 26 to complete an electrochemical cell. Electrode 36 is coupled to external lead 38. The other end of barrel 10 is preferably closed by cap 42 which also serves as a support for leads 24 and 38.

Membrane 28 is preferably held by cap 34 and spacer ring 30 so that the interspace between the pH sensitive membrane 22 and the ammonia-permeable membrane 28 is very thin. Thus, because that interspace communicates with the body of solution 26, it will contain a very thin film, typically a few mil inches, of solution 26.

Membrane 28 is formed of a microporous hydrophobic material having a porosity sufficiently great so as to readily pass ammonia gas but not great enough to permit any appreciable passage of liquid or ions. Preferably membrane 28 comprises a thin (from 0.005 to 0.007 inch thick) disc of microporous polytetrafluorethylene having an average pore size of about 0.6 microns and an average free area in the range of about 50%.

In a preferred embodiment membrane 28 is laminated to an open mesh of a relatively rigid synthetic polymeric material. Because the mesh is intended to reinforce membrane 28 and provide support therefor, the mesh is preferably in a triangular configuration.

Because it is desired that the mesh be substantially inert to solutions containing ammonia, it is preferred that the mesh be made of a high molecular weight polyolefin such as polypropylene, polyethylene and the like.

Some other exemplary membrane materials are set forth in the aforesaid Strickler patent, and include polyvinylidene fluoride (specifically, Gelman's "Metricel VF-6") and polyvinyl chloride, as well as hydrophilic membranes treated with a water repellent such as dimethyl dichlorosilane, and perfluorinated cationic surfactants (e.g., DuPont "Zepel" and 3-M's "FC805").

The standard electrolyte solution is a saturated solution (0.5 M at room temperature) of ammonium picrate in water. In addition, to provide a standard chloride concentration for the reference Ag-AgCl electrode, the electrolyte contains a known amount of a dissolved chloride salt such as NaCl, KCl or the like, preferably about $10^{-4}$ to $10^{-1}$ moles/liter of ammonium chloride or sodium chloride.

One illustrative method of use of this electrode will now be described. With the electrode connected to a suitable high input impedance potentiometric device (e.g., a standard pH meter), a calibration curve is prepared by inserting the electrode into a series of ammonia standardizing solutions of successively increased known ammonia concentrations and the potential across leads 24 and 38, read out in millivolts, is recorded and plotted in semilog graph paper. The standardizing solutions are chosen to bracket the expected ammonia concentration range of the sample by at least an order of magnitude on each side of the expected concentration, e.g., $10^{-4}$, $10^{-3}$, $10^{-2}$, etc. M ammonium chloride. The mv. readings are plotted on semilog graph paper in the linear axis against concentration on the semilog axis.

The sample solution is then prepared. This solution must, because of the partial pressure relationship previously discussed, be at substantially the same temperature and have substantially the same composition of dissolved species as the standardizing solution. In practice, this is carried out, for samples containing low levels of dissolved species, by adding sodium hydroxide (typically, 1 ml. of 10 M NaOH per 100 ml. of sample). Samples having high levels of dissolved species should first be diluted, and then sodium hydroxide added as before.

Finally, the electrode is dipped into the sample solution, and the pH read out in millivolts. This pH can then be converted to ammonium concentration by use of the calibration curve.

Other embodiments will occur to those skilled in the art and are within the following claims.

What is claimed is:

1. In an electrochemical cell for measuring the ammonia content of a sample, said cell including a potentiometric hydrogen ion-sensitive electrode and a reference electrode both in contact with a standard electrolyte, said cell having an ammonia-permeable filter arranged to separate said sample from said electrodes and said electrolyte such that ammonia from said sample can pass through said filter into said electrolyte to affect the hydrogen ion activity of said electrolyte, the improvement wherein said standard electrolyte comprises a saturated aqueous solution of an ammonium salt of a strong acid which has a pK not more than 3, said salt having an aqueous solubility at room temperature such that the ammonium ion concentration in said electrolyte is in the range between about 0.001 M to 1 M.

2. The electrochemical cell of claim 1 wherein said salt is ammonium picrate.

References Cited

UNITED STATES PATENTS 3,649,505  3/1972  Strickler et al. ---- 204—195 P

OTHER REFERENCES

"Analytical Chemistry," Vol. 41, No. 13, November 1969, pp. 1897–1899.

TA-HSUNG TUNG, Primary Examiner

U.S. Cl. X.R.

204—1 T, 195 G